May 10, 1932.  N. LOMBARD  1,858,050
CHANGE SPEED GEAR SET
Filed March 23, 1931    4 Sheets-Sheet 1
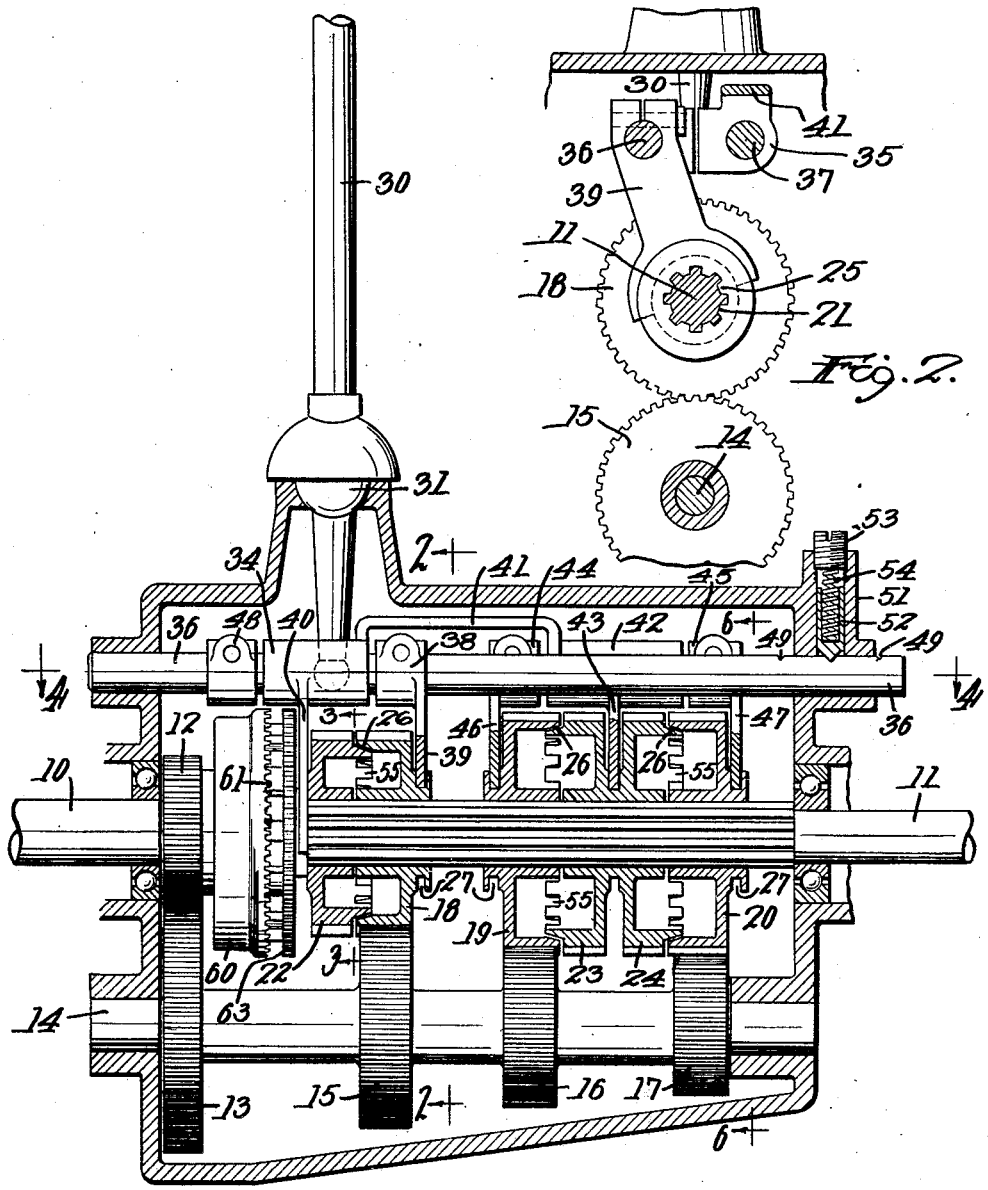
Fig. 2.
Fig. 1.
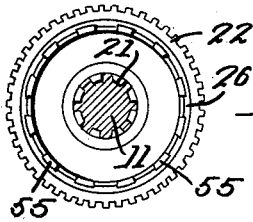
Fig. 3.
Inventor
Nathaniel Lombard
By Attorneys

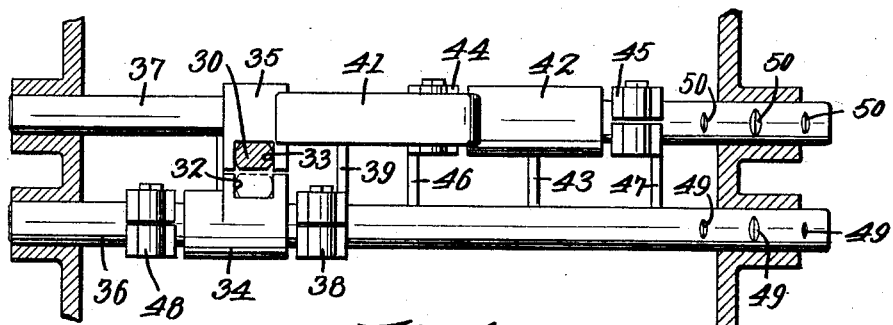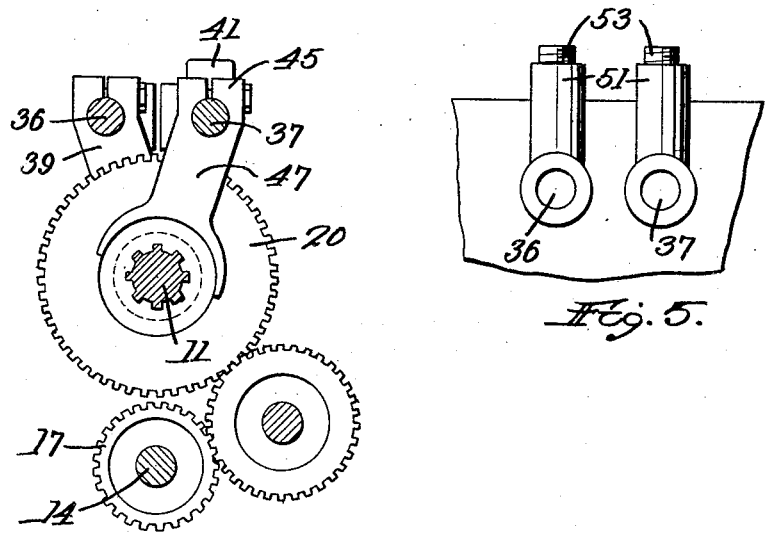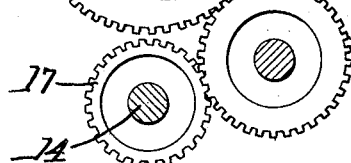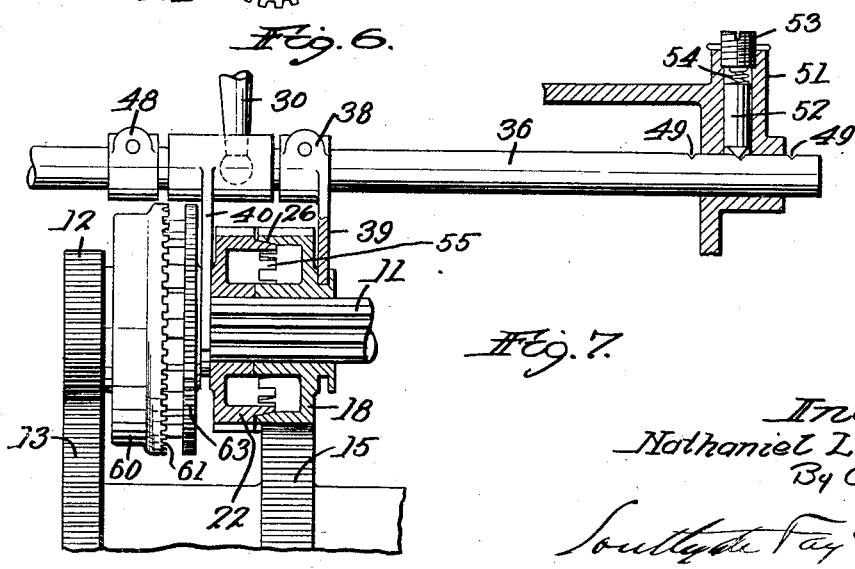

May 10, 1932.  N. LOMBARD  1,858,050
CHANGE SPEED GEAR SET
Filed March 23, 1931  4 Sheets-Sheet 3

Inventor
Nathaniel Lombard
By Attorneys

May 10, 1932.   N. LOMBARD   1,858,050
CHANGE SPEED GEAR SET
Filed March 23, 1931    4 Sheets-Sheet 4

Inventor
Nathaniel Lombard
By Attorneys
Southgate Fay & Hardy

Patented May 10, 1932

1,858,050

UNITED STATES PATENT OFFICE

NATHANIEL LOMBARD, OF WORCESTER, MASSACHUSETTS

CHANGE SPEED GEAR SET

Application filed March 23, 1931. Serial No. 524,521.

This invention relates to noiseless change speed gearing capable of general use but particularly adapted for use on automobiles. Heretofore many devices have been invented for the purpose of securing a more noiseless shifting of gears than results in the usual form of gear transmission; but successful ones have involved complicated and bulky features which are difficult to assemble and require a considerable increase in the size of the gear casing. Moreover, none of the present noiseless change gear devices provides for synchronizing all speeds and reverse.

The principal objects of this invention are to provide a construction, involving few extra and relatively small parts and thus capable of being contained in a small compass, which will provide a noiseless and easy shifting of the gears of a change-speed gear transmission; to provide a device for accomplishing a similar purpose in connection with the shifting to a direct connection between the driving and the driven shafts, to provide these features in a simple, inexpensive and convenient arrangement of parts easy to assemble, and to enable its change-gear operator to synchronize each of all forward and reverse speeds.

Other objects and advantages of the invention will appear hereinafter.

Reference is to be had to the accompanying drawings, in which

Fig. 1 is a sectional view of a gear casing showing a preferred embodiment of this invention in partial elevation and in neutral position;

Fig. 2 is a sectional view on the line 2—2 of Fig. 1;

Fig. 3 is a sectional view on the line 3—3 of Fig. 1, showing one of the gears in elevation;

Fig. 4 is a sectional view on the line 4—4 of Fig. 1, showing the shifting rods in plan;

Fig. 5 is an end view of the outside of the top part of the casing;

Fig. 6 is a sectional view on the line 6—6 of Fig. 1;

Fig. 7 is a view similar to Fig. 1 showing the first set of gears partially shifted from neutral position, to throw them in;

Fig. 8 is a similar view showing them entirely in;

Figure 8:
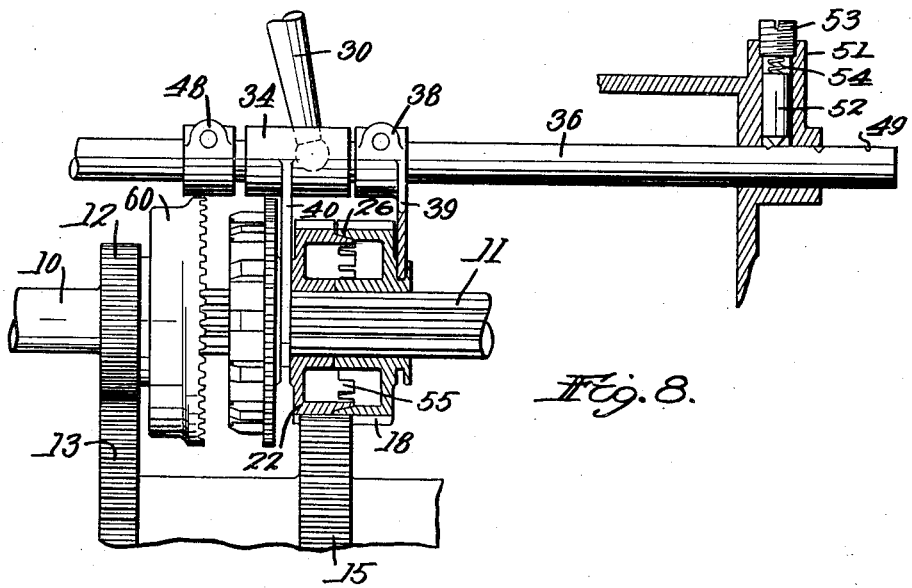
Figures 9, 10:
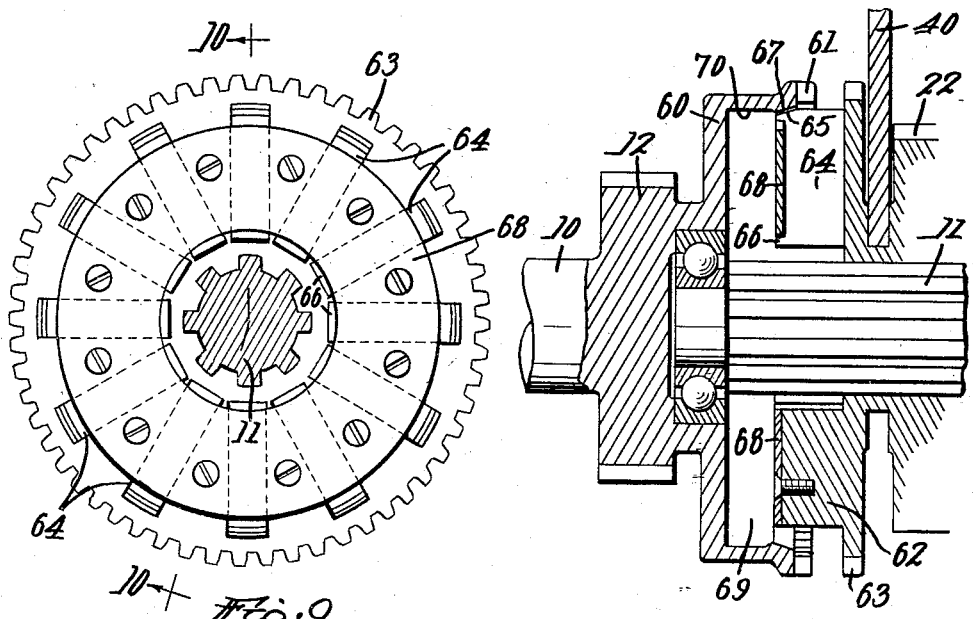
Fig. 9 is an end view of one member of the direct connection clutch.
Fig. 10 is a sectional view on the broken line 10—10 of Fig. 9.
Figure 11:
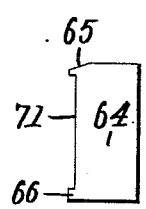
Fig. 11 is a side view of one of the loose blocks shown in Fig. 9.
Figure 12:
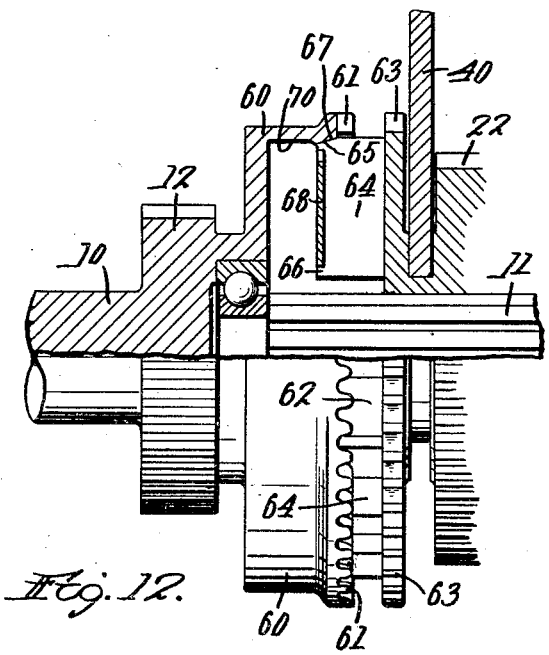
Fig. 12 is a side view of the direct connection clutch, partly in section showing it shifted in part way.

The invention is shown as applied to a gear transmission in general of the well known type. It involves the motor shaft 10 for operating the drive shaft 11. The motor shaft has a gear 12 which is always in mesh with a gear 13 on a countershaft 14, which has in this case three gears 15, 16 and 17 fixed to it and always running. The gear 15 meshes with a gear 18 and the gear 16 with a gear 19 and the gear 17 through a third or reversing gear with a gear 20, which, of course, will reverse the rotation of the shaft 11. The gears 18, 19 and 20 are rotatably mounted on the shaft 11 which throughout this series of gears is provided with longitudinal slots 21.

Fixed to this slotted part of the shaft 11 are a series of gears 22, 23 and 24 cooperating with the gears 18, 19 and 20 respectively in pairs. They are fixed to this shaft 11 by having internal projections 25 extending into the slots 21 and all these six gears are slidable on this shaft. Each pair of gears as 18 and 22, 19 and 23, 20 and 24 are provided with cooperating conical surfaces 26, which are normally out of contact with each other as shown in Fig. 1. On all these gears are circumferentially grooved collars 27 which can be operated by the several yokes as will appear.

The usual shifting lever 30 is employed, which has a universal support 31 to allow it to turn in two directions at right angles to each other. The lower end of it is adapted to engage in either one of two slots 32 and 33 in a pair of shifting slides 34 and 35, one mounted on each of two rods 36 and 37 which are arranged parallel with each other as usual and are shiftable endwise. The front one of these rods 36 is provided with a split collar 38 fixed to it and having a yoke 39 and also a split collar 48 fixed to the rod. The shifting slide 34 is also provided with a yoke 40. The rear slide 35 is provided with a bridge 41 which connects it with a slide 42 on the rod 37. This slide 42 is provided with a yoke 43. On the rod 37 there are two split collars 44 and 45 fixed to it and provided with two yokes 46 and 47. These several yokes 39, 40, 43, 46 and 47 are all connected with the several collars 27 and therefore are adapted to shift the several gears in certain relationships. The split collars are all spaced from the slides 34 and 42 when the parts are in neutral position as shown in Fig. 1.

One of each pair of gears, as for example, 22, 23 and 24, is provided in its conical surface 26 with notches 55 around the circumference. These notches are provided so that when the two conical surfaces of the gears of each pair come together any oil getting in between them will be scraped off by the square edges of these notches and prevent it from causing any restriction to the effectiveness of the cone clutches.

Each rod 36 and 37 is provided in this case with three V-shaped notches 49 and 50. In cooperation with each one is a cylinder 51 having a spring-pressed plunger 52 provided with a V-shaped end to enter these notches. A screw 53 is arranged at the top of each cylinder to hold the spring 54 and provide access to the interior. The screw also is capable of adjusting the compressing of the spring. The center one of the notches 49 and 50 is deeper than the others to afford more resistance when shifting from neutral into gear.

Figure 13:
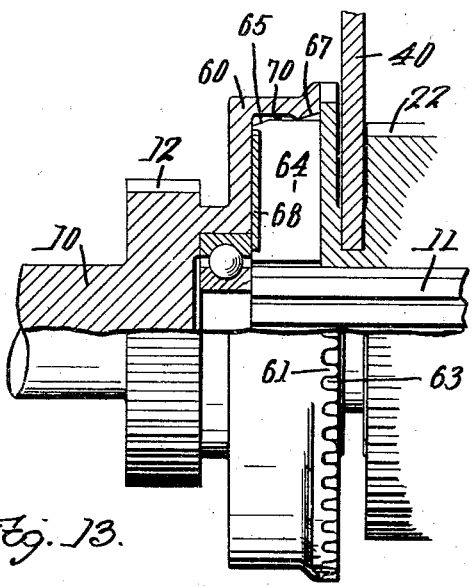
Fig. 13 is a similar view showing it fully connected.

The means for connecting the two shafts 10 and 11 directly to each other to give the highest speed is in the form of a clutch having a similar construction. Integral or fixed to the shaft 10 and the gear 12 is a female member 60 of a clutch having teeth 61 on its edge. Fixed to or integral with the gear 22 is a male member 62 of this clutch. This has teeth 63 projecting from its edge and adapted, when the parts are closed together as shown in Fig. 13, to mesh therewith. This member 62 also has radial recesses therein in which are located loose blocks 64, each one provided with a tapered surface 65 which in the aggregate constitute an interrupted conical surface. Each one is provided with a stop end 66 projecting toward the shaft 10. It also has a recess 71 for receiving a plate 68. The female member 60 is provided with an internal conical surface 67 and a circular recess 69 enlarged at 70 beyond the surface 67. The member 62 is provided with an annular plate 68 which retains the blocks 64.

In the operation of the device, starting from neutral position as shown in Fig. 1, if it is intended to start in reverse or low forward speed the shifting lever 30 is shifted so that the lower end will come into the notch 3a as shown in Fig. 4 and then it is moved from central position either to the front or back according to the desired direction of motion. In either case the gear 23 or 24, as the case may be, will be caused to move over toward its companion gear and the conical surfaces 26 are brought into contact.

It will be understood of course that the gears 19 and 20 as well as 18 are constantly running and therefore the gear 23 or 24 will be started up frictionally. It will soon get to the speed of the gear 19 or 20 and although the teeth of the two gears may not be in registration they will rotate at practically the same speed. The motion of the rod 37 brings its plunger 52 part way out of its notch as shown in Fig. 7 for example and creates a resistance which is released as soon as the plunger is entirely out of the notch. This relieves the pressure on the conical surfaces 26 allowing a little slip between the two gears which will bring the teeth of the two gears of the pair into registration. Then the further shifting of the rod will slide the gears together, as will be seen readily. Thus the gears 16 and 23 or 17 and 24 will be in mesh at their edges and as the rod is shifted further along they will come into sideways registration with each other and the shaft 11 will be rotated in the direction desired.

It will be understood readily that, if the gears 16 and 23 are thus brought into mesh, the shaft 11 will be rotated at slow speed and when it is desired to move the second shaft the lever 30 is manipulated to bring the bottom of it into the notch 32 and the slide 34 will then be under the control of the operator. He can shift this along until, through the yoke 40, the gear 22 has moved into contact with the conical surface 26 of the gear 18 and then by pushing further the same results will occur as above described and the gear 22 will come into mesh with the gear 15.

After this has been accomplished, if he desires to bring the shafts 10 and 11 into clutching connection, he moves the lever 30 in the opposite direction and first pulls the gear 22 out slightly so that it is no longer in frictional contact with the conical surface 26 on the gear 18. The slide 34 now engages the collar 48 fixed on the rod 36 and moves that rod bodily. This starts the plunger 52 upwardly in its notch 49 and of course, positively draws the gear 22, through the yoke 40, out of mesh with the gear 15 while, through the yoke 39, the gear 18 commences to slide in and soon the parts are in the position in which the plunger is in the central notch 49 and the rod 36 is in neutral position again. Now moving the rod 36 to the left, brings the male member of the clutch into such position that the blocks 64 engage the conical surface 67 and this whole member will commence to rotate at a little higher speed. The blocks 64, of course, are rotating at a comparatively high speed and are thrown out by centrifugal force to secure this result. As the rod 36 is pushed further to the left these blocks will be crowded into the cylindrical inner recess in the member 60. The recesses 70 and 71 release the pressure in the clutch and allow the movable section thereof to move in freely as soon as the surface 67 is passed. Thus a result similar to that obtained in the gear shifts through the sliding gears is obtained. The gear 22 will be withdrawn from all contact with the gear 18 so that the latter rotates idly on the shaft 11. A further movement in the same direction brings the teeth 61 and 63 into engagement with each other as shown in Fig. 13 and the two shafts are positively clutched together.

It will be understood therefore that by this invention the gears of the entire transmission, involving the reverse and two or more speed changes in a forward direction, can be accomplished without the clutching of gears in a very quick manner and also without the danger of knocking off the teeth or the corners of the teeth when the gear changes are made. The parts are durable and unlikely to get out of order and very little is added to the ordinary gear transmission so that the whole transmission will occupy little or any more space than it does without these additions. This reduces the space very materially, at least over the devices not on the market for reducing the noise of gear changes, and there are no conditions under which the operator has not full control of the drive.

Although I have illustrated and described only one form of the invention I am aware of the fact that modifications can be made therein by any person skilled in the art without departing from the scope of the invention as expressed in the claims. Therefore I do not wish to be limited in this respect but what I do claim is:—

1. In a transmission gear set, the combination with a motor shaft, a driven shaft and a counter-shaft, of means by which the counter-shaft is driven constantly, from the driving shaft, a gear on the counter shaft, a pair of gears on the driven shaft, one normally meshing with the gear on the counter-shaft but freely rotatable on the driven shaft, the other located adjacent to the said gear on the driven shaft and slidably keyed thereto and normally out of mesh with the gear on the counter-shaft, said pair of gears having frictional surfaces on their adjacent sides adapted to come into contact with each other to drive the keyed gear from the loose gear by friction prior to the movement of the tight gear into mesh with the gear on the counter-shaft, a slidable rod adapted to be moved longitudinally by the operator and having movably mounted thereon a yoke for engaging the keyed gear and moving it, two collars fixed on the rod and spaced from the ends of the yoke when in neutral position, said rod having notches and a spring-pressed plunger normally engaging in one of said notches, whereby when the rod is pushed over the plunger will be forced outwardly in the notch while the keyed gear comes into frictional contact with the conical surface on the loose gear, for the purpose described.

2. In a transmission gear set, the combination with a motor shaft, a driven shaft and a counter-shaft, of gears for constantly driving the counter-shaft from the motor shaft, a gear fixed on the counter-shaft, a pair of gears, one slidably keyed and the other loose on the driven shaft having the same number of teeth, either one adapted to mesh with the gear on the counter-shaft and having frictional driving surfaces between them, whereby when the loose gear is in mesh with the counter-shaft gear and the keyed gear is moved toward it, the first effect will be to pick up the keyed gear and rotate it by friction from the loose gear, a slidable rod adapted to be moved by the operator having V-shaped notches, a spring-pressed plunger having a V-shaped end adapted to enter one of said meshes, a slide mounted on the rod and connected with the operating lever, two collars fixed to the rod, both normally at a short distance from the ends of said slide, a yoke connected with said slide to operate the keyed gear and a yoke connected with one of said collars for operating the loose gear, whereby when the operating lever is moved from neutral position the spring-pressed plunger will be gradually forced out of its notch while the gears come into contact with their frictional surfaces for rotating the driven shaft.

3. In a transmission gear set, the combination with a motor shaft, a driven shaft and a counter-shaft, of means by which the counter-shaft is driven constantly, from the driving shaft, a gear on the counter shaft, and a pair of gears on the driven shaft, one normally meshing wth the gear on the counter-shaft but freely rotatable on the driven shaft, the other located adjacent to the said gear on the driven shaft and slidably keyed thereto, said pair of gears having flat circular frictional surfaces on their adjacent sides adapted to come into contact with each other to drive the keyed gear by the loose gear by friction prior to the movement of the keyed gear into mesh with the gear on the counter-shaft, the contacting flat circular surfaces of one member of said pair of gears having notches therein at intervals for the purpose of removing surplus lubricant and the like from the corresponding surfaces of the other gear.

4. In a gear transmission set, the combination with a driving shaft, a driven shaft and a counter-shaft, of means for transmitting the rotation of the driving shaft to the counter-shaft, a plurality of gears on the counter-shaft, a corresponding number of gears loosely mounted on the driven shaft and normally in mesh with the several gears on the counter-shaft, a corresponding number of gears slidably keyed to the driven shaft and of the same size as the respective gears loosely mounted thereon, each pair of gears, a loose one and a keyed one on the driven shaft, having co-acting frictional surfaces adapted to cause the gears keyed to the driven shaft to be driven by the gears loose on it when these surfaces are moved into contact, and a clutch for connecting the motor shaft directly with the driven shaft comprising frictional elements which, under the action of centrifugal force, will cause the driven shaft to be rotated by frictional contact when the clutch is being thrown in, and positive means for connecting the two parts of the clutch together when fully thrown in.

In testimony whereof I have hereunto affixed my signature.

NATHANIEL LOMBARD.